UNITED STATES PATENT OFFICE.

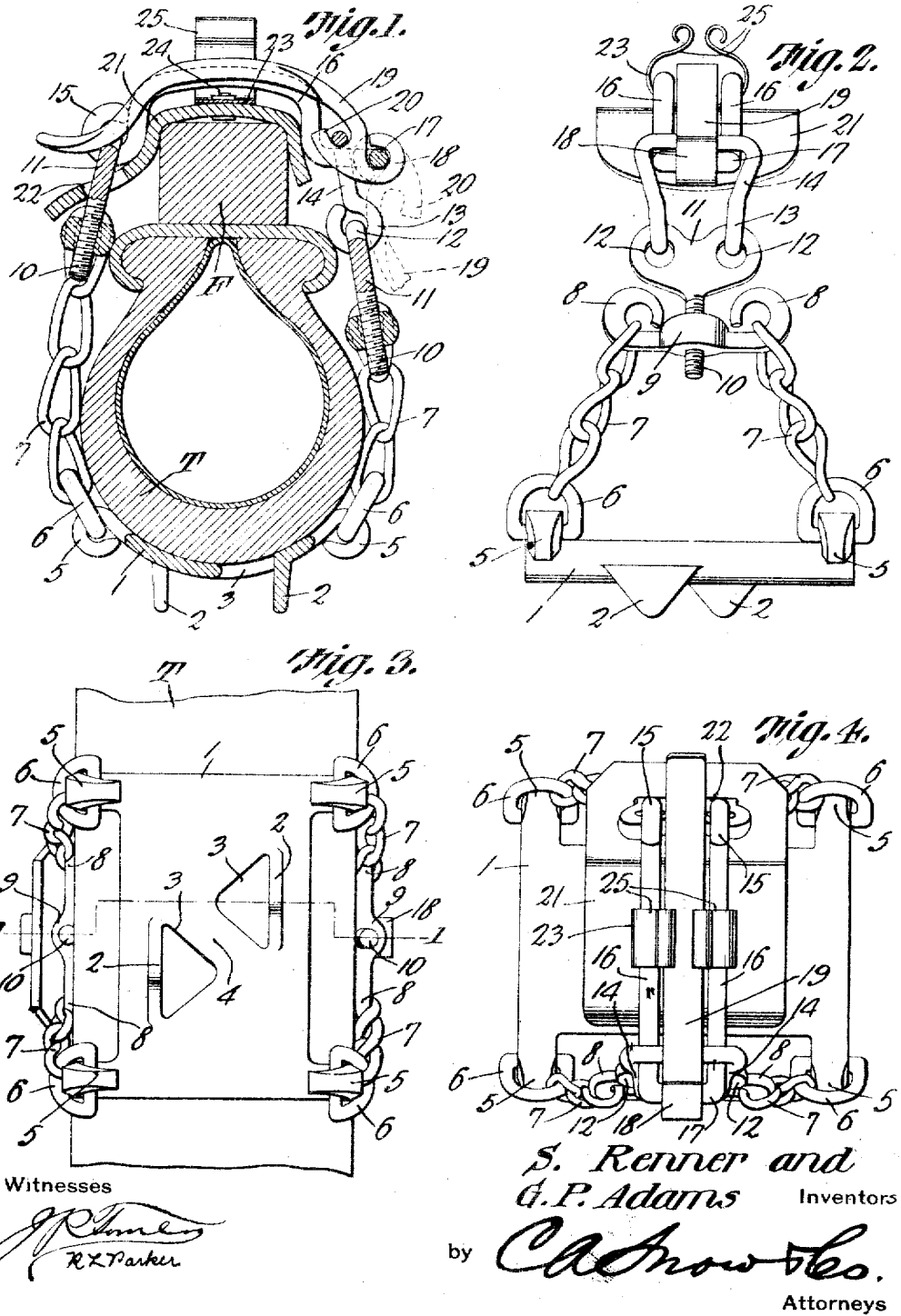

SAMUEL RENNER AND GEORGE P. ADAMS, OF WESTERN, NEBRASKA.

ANTISKID DEVICE.

1,205,021.

Specification of Letters Patent.  Patented Nov. 14, 1916.

Application filed November 22, 1915. Serial No. 62,810.

*To all whom it may concern:*

Be it known that we, SAMUEL RENNER and GEORGE P. ADAMS, citizens of the United States, residing at Western, in the county of Saline, State of Nebraska, have invented a new and useful Antiskid Device, of which the following is a specification.

The present invention appertains to antiskid devices for pneumatic tires, and aims to provide a novel and improved appliance of that nature which when applied to a pneumatic tire will eliminate skidding, and will increase the traction.

It is the object of the invention to provide an anti-skid device having a shoe of novel construction to fit the tread of a tire and to effectively engage the ground for the intended purposes.

Another object is the provision of novel means for attaching the shoe detachably to the tire, said means enabling the shoe to be quickly applied and removed, and holding the shoe firmly in place when it is applied to the tire.

It is also within the scope of the invention to provide an anti-skid device having the characteristics above noted, and which is comparatively simple and inexpensive in construction and manufacture, the device being readily carried in the tool kit or other receptacle, and being thoroughly practical, reliable and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a sectional view of the device taken on the line 1—1 of Fig. 3. Fig. 2 is a side elevation of the device. Fig. 3 is a plan view of the device, and Fig. 4 is an opposite plan view thereof.

The device embodies a shoe or tread plate 1 which is curved longitudinally and transversely to fit the tread of a pneumatic tire T, and said shoe is provided with a pair of diagonally opposite parallel longitudinal outstruck spurs 2 adjacent its side edges and forming openings 3 at the inner sides of said outstanding spurs and a diagonal cross bar 4 between said openings and spurs. The free ends of the two spurs project outwardly beyond a plane tangent to the central portion of the cross bar 4, said cross bar being bulged outwardly between the spurs or openings 3.

With the formation of the shoe as above described, when the wheel is running upon a hard surface, the shoe will bear upon the surface between the spurs, so that only the points of the spurs engage the ground, whereas if the ground is soft or yielding, the bulged or central portion of the shoe will be depressed into the ground, and this will bring the spurs entirely into the ground for increasing the traction and eliminating the liability of skidding. The cross bar 4 extends diagonally across the bulged portion of the shoe which engages the ground, and which is of obvious advantage.

The shoe 1 is provided at its four corners with hooks or eyes 5 for attaching the shoe in place, the hooks or eyes 5 being readily bent from the blank from which the shoe is formed, as are also the spurs 2. The shoe can thus be readily and inexpensively manufactured.

In order to attach the shoe to the wheel of an automobile, motor truck or equivalent vehicle, opposite pairs of short chains 7 are engaged at their outer ends to D-shaped rings 6 engaged with the hooks 5, the links of the chains being flattened or so formed as to rest snugly against the tire without danger of chafing or cutting the same. The inner ends of each pair of chains 7 are engaged with the oppositely projecting hooks 8 of a nut 9 threaded upon a bolt 10 having a flattened head 11 provided with opposite eyes 12.

The terminal eyes 13 of a U-shaped stirrup 14 engage the eyes 12 of one bolt 10, and the eyes 12 of the other bolt at the opposite side are engaged by the terminal eyes 15 of a doubled saddle 16 formed from a rod or other suitable piece of stock which is doubled and bent so as to fit around the felly or rim F of the wheel. The limbs of the saddle 16 are curved or arched to fit around the felly, as clearly seen in Fig. 1, and the bend or intermediate portion 17 of the saddle 16 extends angularly for the engagement of the stirrup 14 to attach the said parts together.

In order to attach the opposite pairs of chains together (or to attach together the ends of the flexible device which passes around the tire), an eye 18 of a curved latch lever 19 is pivotally mounted upon the bend 17 of the saddle 16, and is provided adjacent the eye 18 with a hook or seat 20 for the engagement of the stirrup 14. The lever 19 is adapted to be swung to a position between the limbs of the saddle 16, so that the hook 20 is brought within the bend of the saddle at the inner side of the pivot of the lever 19.

A pad 21 of leather or other equivalent material is disposed within the saddle 16 and is provided with an opening 22 adjacent one end through which that bolt 10 extends which is connected to the saddle, for assisting in holding the pad in place. The pad is adapted to fit the felly F to prevent the saddle or other part from chafing or otherwise injuring the felly.

A spring clip 23 is secured to the pad 21 by means of a securing element 24, and extends around the limbs of the saddle 16, said clip having spring fingers or terminals 25 converging toward one another and overhanging the saddle, whereby when the lever 19 is swung adjacent the saddle, the same forces the fingers 25 apart. Thus, when the lever 19 is swung within the saddle, the clip 23 holds the lever 19 in place, although the lever can be swung forcibly away from the saddle between the fingers 25 to detach the device.

In applying the device, supposing the stirrup or clevis 14 and latch lever 19 to be detached, the device is placed around the tire and felly at the desired point, and the free end of the lever 19 is inserted through the stirrup 14. The saddle 16 is properly placed against the felly F with the shoe 1 properly upon the tread of the tire T, in which event the lever 19 is swung from the dotted line position in Fig. 1 to the full line position in said Fig. 1. The stirrup 14 is thus carried by the lever toward the saddle and onto the angular bend 17 thereof, the lever 19 being forced between the spring fingers 25 to be held within the saddle. The device is thus tightened about the tire and felly, and will be locked or secured in place, since the stirrup 14 which is connected to the chains 7 at one side is engaged with the hook 20 of the lever 19, which hook is located between the pivot of said lever and the free end thereof whereby the pull on the stirrup 14 will hold the lever in place. The lever bears against the head 11 of one bolt, as seen in Fig. 1. Thus the greater the tendency to pull the ends of the flexible device apart which passes around the tire, the greater will be the tendency to hold the latch lever 19 in locked position. The device will be held firmly in place upon the felly and tire, the saddle in fitting the felly preventing the shoe from being displaced transversely. The device will effectively serve its intended office, and can be readily applied to and removed from the felly and tire.

One or more of the devices can be used upon a wheel, and one or more of the wheels of an automobile or motor vehicle can be equipped with the devices, as circumstances may dictate. Each device is complete in itself and can be readily applied and removed, and any number of the devices can be carried in the tool kit or other receptacle of an automobile to be applied in a few moments to the wheels when necessary, due to a rain storm, slippery roads, or the like. Before the device is applied, the bolts 10 can be threaded within the nuts 9 for adjusting the device to properly accommodate the felly and tire, the flexible device which passes around the felly and tire being shortened or lengthened by properly adjusting said bolts. In this manner, the device can be adjusted to accommodate fellies and tires of different dimensions.

Having thus described the invention, what is claimed as new is:

1. An anti-skid device embodying a shoe, opposite pairs of flexible elements attached thereto, a pair of nuts each having opposite hooks to which one pair of said flexible elements are attached, bolts threaded through said nuts and having heads, and means for detachably coupling said heads together around a felly.

2. An anti-skid device embodying a pair of nuts to be disposed at opposite sides of a tire, a flexible structure connected to said nuts and adapted to pass around the tread of the tire, bolts threaded through said nuts, and means for detachably coupling the bolts together around a felly, to prevent the rotation of the bolts unless they are uncoupled, said structure preventing the rotation of the nuts.

In testimony that we claim the foregoing as our own, we have hereto affixed our signatures in the presence of two witnesses.

SAMUEL RENNER.
GEORGE P. ADAMS.

Witnesses:
GEO. F. SAWYER,
J. G. SAWYER.